United States Patent
Jin et al.

(10) Patent No.: US 10,025,416 B2
(45) Date of Patent: Jul. 17, 2018

(54) DISPLAY PANEL AND METHOD FOR FORMING THE SAME

(71) Applicants: Shanghai AVIC OPTO Electronics Co., Ltd., Shanghai (CN); TIANMA MICRO-ELECTRONICS CO., LTD., Shenzhen (CN)

(72) Inventors: Huijun Jin, Shanghai (CN); Gujun Li, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 263 days.

(21) Appl. No.: 14/919,313

(22) Filed: Oct. 21, 2015

(65) Prior Publication Data

US 2016/0291774 A1  Oct. 6, 2016

(30) Foreign Application Priority Data

Apr. 1, 2015  (CN) .......................... 2015 1 0152960

(51) Int. Cl.
  *G06F 3/041* (2006.01)
  *G06F 3/044* (2006.01)
  *G02F 1/1333* (2006.01)

(52) U.S. Cl.
  CPC ........ *G06F 3/0416* (2013.01); *G02F 1/13338* (2013.01); *G06F 3/044* (2013.01); *G06F 3/0412* (2013.01); *G06F 2203/04103* (2013.01)

(58) Field of Classification Search
  None
  See application file for complete search history.

(56) References Cited

U.S. PATENT DOCUMENTS

2005/0231534 A1  10/2005  Lee
2009/0290080 A1*  11/2009  Horiuchi ................ G02B 5/201
                                                                349/38
(Continued)

FOREIGN PATENT DOCUMENTS

CN      1691102 A   11/2005
CN    101334561 A   12/2008
(Continued)

OTHER PUBLICATIONS

Chinese Application No. 201510152960.4, First Office Action dated Feb. 27, 2017.

Primary Examiner — Amare Mengistu
Assistant Examiner — Sarvesh J Nadkarni
(74) Attorney, Agent, or Firm — Alston & Bird LLP

(57) ABSTRACT

A display panel and a method for forming the same are provided. A display panel includes: a first substrate and a second substrate, which are set corresponding to each other; the first substrate includes multiple pixel regions arranged in a matrix form, and a first black matrix is disposed in intervals between the pixel regions; each of the pixel regions includes a first sub pixel region, a second sub pixel region, a third sub pixel region and a fourth sub pixel region; the first sub pixel region includes a first sub pixel unit, the second sub pixel region includes a second sub pixel unit, the third sub pixel region includes a third sub pixel unit; the fourth sub pixel region includes a fourth sub pixel unit and a second black matrix. Accordingly, the display panel may improve display performance.

10 Claims, 5 Drawing Sheets

(56) References Cited

U.S. PATENT DOCUMENTS

| | | | | |
|---|---|---|---|---|
| 2010/0103121 A1* | 4/2010 | Kim | .................... | G02F 1/13394 345/173 |
| 2015/0185568 A1* | 7/2015 | Zheng | ............... | G02F 1/136209 349/43 |
| 2016/0097946 A1* | 4/2016 | Higano | ............. | G02F 1/133512 349/12 |

FOREIGN PATENT DOCUMENTS

| | | |
|---|---|---|
| CN | 102636894 | 8/2012 |
| CN | 104238787 A | 12/2014 |
| JP | 2001296523 A | 10/2001 |

\* cited by examiner

DISPLAY PANEL AND METHOD FOR FORMING THE SAME

CROSS-REFERENCE TO RELATED APPLICATIONS

The present application claims priority to Chinese patent application No. 201510152960.4, filed on Apr. 1, 2015, and entitled "DISPLAY PANEL AND METHOD FOR FORMING THE SAME", the entire disclosure of which is incorporated herein by reference.

BACKGROUND OF THE INVENTION

Liquid Crystal Displays (LCD) and Organic Light-Emitting Diode (OLED) displays possess advantages such as low radiation, small in volume, low energy consumption, etc, and thus are widely used on information products such as laptops, Personal Digital Assistants (PDA), flat-screen televisions, mobile phones, etc.

Display technology integrating touch-control technology has been gradually throughout people's daily life. Nowadays, a touch screen could be classified based on formation structures thereof as: an external add-on touch screen, a surface touch screen and an embedded touch screen. The embedded touch screen embeds touch-control electrodes of the touch screen inside a display panel, which may make a whole module thinner and greatly reduce manufacturing cost of the touch screen, and be in favor with all panel manufacturers. In current practices, an embedded capacitive touch screen includes two principles utilizing mutual capacitance and self-capacitance to realize detection of touch positions by fingers. Wherein, the principle utilizing the self-capacitance may set multiple self-capacitance electrodes in the touch screen, which are on a same layer and mutually nonconductive. When human body does not touch the screen, capacitance carried by each of the self-capacitance electrodes remains constant. When human body touches the screen, capacitance carried by the corresponding self-capacitance electrodes become the constant capacitance plus a human body capacitance. Within a touch-control time period, a touch-control detection chip may determine the touch-control position via detecting capacitance change of each self-capacitance electrode.

A four-color sub pixel is used to improve panel brightness effect of a liquid crystal panel. However, for an embedded capacitance touch screen employing the self-capacitance principle, when the self-capacitance touch-control electrodes and signal wire arrangement thereof are considered, it is required that the four-color sub pixel is designed exclusively to prevent light leakage or avoid a problem that component structures are not completely covered.

DETAILED DESCRIPTION OF THE INVENTION

Figure 1:
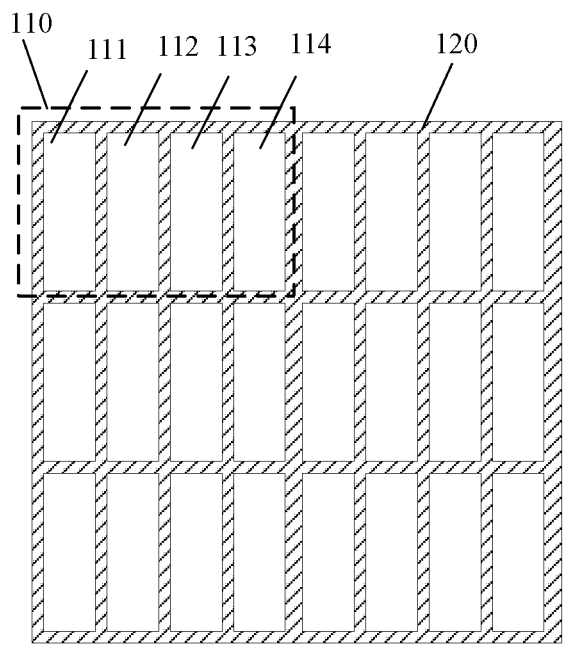
FIG. 1 schematically illustrates a diagram presenting a part of a substrate included in a display panel in prior arts.

FIG. 1 schematically illustrates a diagram presenting a part of a substrate included in a display panel in prior arts, and the substrate includes multiple pixel regions 110 arranged in a matrix form. As shown in FIG. 1, a dash line frame surrounds one of the pixel regions 110 for demonstration. A black matrix 120 is disposed in intervals between the pixel regions 110. Each of the pixel regions 110 includes a first sub pixel region 111, a second sub pixel region 112, a third sub pixel region 113 and a fourth sub pixel region 114. The first sub pixel region 111 includes a first sub pixel unit (not shown), the second sub pixel region 112 includes a second sub pixel unit (not shown), the third sub pixel region 113 includes a third sub pixel unit (not shown) and the fourth sub pixel region 114 includes a fourth sub pixel unit (not shown).

Figure 2:
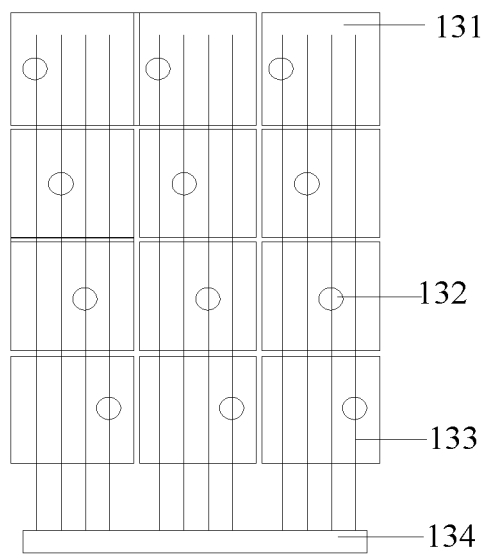
FIG. 2 schematically illustrates a diagram presenting a part of another substrate included in the display panel in prior arts as shown in FIG. 1.

FIG. 2 schematically illustrates a diagram presenting a part of another substrate included in the display panel in prior arts as shown in FIG. 1, and the substrate includes multiple equal-area electrodes 131. The electrodes 131 are one-to-one electrically connected to a chip 134 via signal wires 133. Wherein, the signal wires 133 are electrically connected to the corresponding electrodes 131 respectively via through holes 132 in an insulative layer (not shown). Wherein, structures such as intervals between the neighboring electrodes 131 and the signal wires 133 need to employ a light-proof black matrix to get covered in a design process.

In prior arts, two substrates in FIGS. 1 and 2 may not be fully considered, and for example, when improving display performance, the electrodes 131, signal wires 133 and other structures need to be adjusted and changed but prior arts may not provide a corresponding covering plan, which may cause situations that exposure of component structures, light leakage, etc, and performance of the display panel may not be improved.

Therefore, the present disclosure provides a display panel and a method for forming the same. The display panel may prevent the situations that exposure of the component structures and light leakage of the display panel via adding a second black matrix on a first substrate to cover structures on a second substrate so as to improve the display performance of the display panel.

In order to clarify the objects, characteristics and advantages of the present disclosure, embodiments of the present disclosure will be described in detail in conjunction with the accompanying drawings.

Embodiments of the present disclosure provide a display panel.

Figure 3:
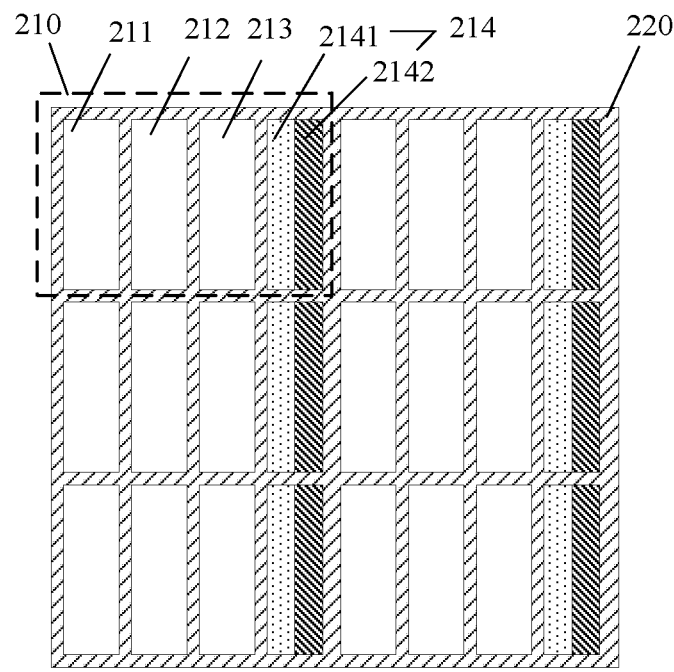
FIG. 3 schematically illustrates a diagram presenting a part of a first substrate in the display panel according to one embodiment of the present disclosure.
Figure 4:
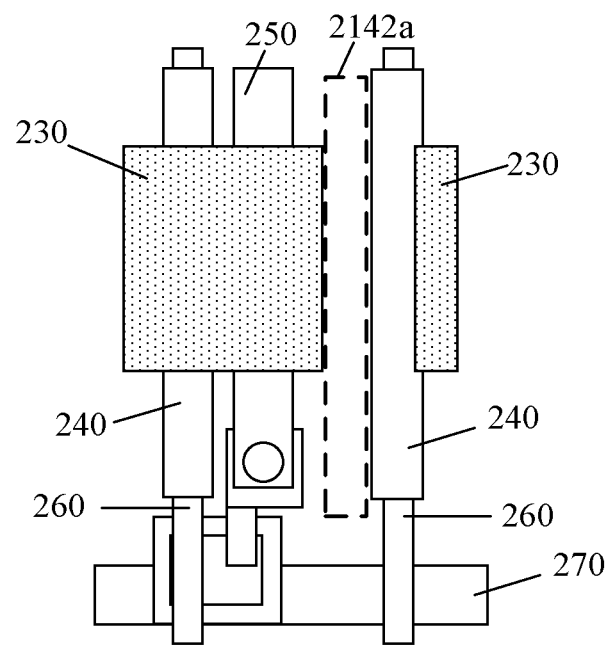
FIG. 4 schematically illustrates a diagram presenting a part of a second substrate in the display panel as shown in FIG. 3.

Referring to FIGS. 3 and 4, the present disclosure provides a display panel including a first substrate (not shown) and a second substrate (not shown), which may be set corresponding to each other. Wherein, partial structures of the first substrate are shown in FIG. 3, and partial structures of the second substrate are shown in FIG. 4. The first substrate may be a color-film substrate, and the second substrate may be an array substrate.

Referring to FIG. 3, the first substrate includes multiple pixel regions 210 arranged in a matrix form, one of the pixel regions 210 is surrounded by a dash-line frame as shown in FIG. 3. A first black matrix 220 is disposed in intervals between the pixel regions 210. Each of the pixel regions 210 includes a first sub pixel region 211, a second sub pixel region 212, a third sub pixel region 213 and a fourth sub pixel region 214. The first sub pixel region may include a first sub pixel unit (not shown), the second sub pixel region may include a second sub pixel unit (not shown), the third sub pixel region may include a third sub pixel unit (not shown), and the fourth sub pixel region includes a fourth sub pixel unit 2141 and a second black matrix 2142.

Specifically, the first black matrix 220 is disposed in intervals between the sub pixel regions, and namely, the first black matrix 220 is in intervals between the first sub pixel region 211, second sub pixel region 212, third sub pixel region 213 and fourth sub pixel region 214.

In this embodiment, in each of the pixel regions 210, the first sub pixel region 211, the second sub pixel region 212, the third sub pixel region 213, the fourth sub pixel region 214 may be side-by-side arranged in order. In some embodiments, the fourth sub pixel region 214 may be arranged in front of the first sub pixel region 211, or four sub pixel regions may employ other permutations.

In this embodiment, the first sub pixel unit, second sub pixel unit and third sub pixel unit may respectively be one of a red sub pixel unit, a green sub pixel unit and a blue sub pixel unit, and the first, second and third sub pixel unit are in different colors so that one of the pixel regions 210 includes tricolor sub pixel units that the red, green and blue sub pixel unit.

In this embodiment, the fourth sub pixel unit 2141 may be a white sub pixel unit, a yellow sub pixel unit, a green sub pixel unit, etc.

In this embodiment, the first sub pixel region 211, second sub pixel region 212, third sub pixel region 213 and fourth sub pixel region 214 may be equal in area. Since the fourth sub pixel region 214 includes both the fourth sub pixel unit 2141 and second black matrix 2142, the fourth sub pixel unit 2141 may be smaller in area than the first sub pixel unit, second sub pixel unit and third sub pixel unit.

In some embodiment, the first sub pixel region 211, second sub pixel region 212, third sub pixel region 213 and fourth sub pixel region 214 may not be equal in area.

Referring to FIG. 3, along a row direction of the display panel, the second black matrix 2142 is disposed between the fourth sub pixel unit 2141 and the first black matrix 220. Along a column direction of the display panel, the first black matrix 220 surrounds the second black matrix 2142.

Specifically, in this embodiment, the row direction is a horizontal direction as shown in FIG. 3, and the column direction is a vertical direction as shown in FIG. 3.

In this embodiment, the first black matrix 220 and second black matrix 2142 may be manufactured using a same material or different materials. Furthermore, they may be manufactured simultaneously employing a same art or separately.

Referring to FIG. 4, multiple common electrodes 230 arranged in a matrix form are formed on the second substrate, and FIG. 4 illustrates two common electrodes 230 in one row as representatives. A first interval region (not shown) is disposed between two neighboring common electrodes 230 in a same row, and namely, the first interval region is disposed between two common electrodes 230 shown in FIG. 4.

Referring to FIG. 4, the first interval region may be set corresponding to the first black matrix 220 and second black matrix 2142, and namely, along a direction perpendicular to a plane shown in FIG. 4, the first interval region may completely overlap both the first black matrix 220 and second black matrix 2142. As shown in FIG. 4, a dash-line frame 2142a represents a projection of the second black matrix 2142 on the first interval region.

Although a projection of the first black matrix 220 on the first interval region is not shown, the first interval region may be set corresponding to the first black matrix 220 except for a part of the first interval region surrounded by the dash-line frame 2142a.

In this embodiment, for the purpose that the first interval region may be set corresponding to both the first black matrix 220 and the second black matrix 2142, the first interval region may be set facing both the first black matrix 220 and second black matrix 2142.

Referring to FIG. 4, the second substrate has signal wires 240, pixel electrodes 250, data wires 260 and gate wires 270. Each of the pixel electrodes 250, data wires 260 and gate wires 270 may be electrically connected to a drain, a source and a gate of a thin-film transistor (not labeled in FIG. 4) respectively.

Even through not shown in FIG. 4, the signal wires 240 may be electrically connected to the common electrodes 230, and the common electrodes 230 may realize at least two functions via the signal wires 240: at a display stage, the common electrodes 230 and the pixel electrodes 250 may provide a corresponding driving electric field; at a touch-control stage, the common electrodes 230 may become self-capacitance touch-control electrodes to detect touch operations.

In the display panel provided in the present disclosure, the second black matrix 2142 may be added on the first substrate, which may prevent exposure of structures on the second substrate and light leakage appeared on the display panel so as to improve the display performance of the display panel.

On the second substrate, the first interval region may be set corresponding to the first black matrix 220 and second black matrix 2142. Compared to the first interval region may only be set corresponding to the first black matrix 220, the first interval region may become wider and the extended width is equivalent to a width of the second black matrix 2142. Expansion of the first interval region may prevent situations such as etching, residue between two neighboring common electrodes 230 in a same row and problems such as short circuit between two neighboring common electrodes 230 in a same row, and further improve the display performance of the display panel.

Specifically, in this embodiment, a width of the first interval region is a size of the first interval region along the row direction. A width of the second black matrix 2142 is a size of the second black matrix 2142 along the row direction.

The present disclosure also provides a method for forming a display panel, and the method may be used to form the display panel provided in the embodiment stated hereinbefore. Thus, the method may refer to corresponding content of the embodiment stated hereinbefore.

Referring to FIG. 3, a first substrate may be set including multiple pixel regions 210 arranged in a matrix form. A black matrix 220 may be formed in intervals between the pixel regions 210. A first sub pixel region 211, a second sub pixel region 212, a third sub pixel region 213 and a fourth sub pixel region 214 may be set in each of the pixel regions 210. A first sub pixel unit (not shown) may be formed in the first sub pixel region 211, a second sub pixel unit (not shown) may be formed in the second sub pixel region 212, a third sub pixel unit (not shown) may be formed in the third sub pixel region 213 and a fourth sub pixel unit 2141 and a second black matrix 2142 may be formed in the fourth sub pixel region.

In this embodiment, the first substrate may be made of glass.

In this embodiment, in each of the pixel regions 210, the first sub pixel region 211, second sub pixel region 212, third sub pixel region 213 and fourth sub pixel region 214 may be side-by-side arranged in order. In some embodiments, the fourth sub pixel region 214 may be arranged in front of the first sub pixel region 211, or the four sub pixel regions may employ other permutations.

In this embodiment, the first sub pixel unit, second sub pixel unit and third sub pixel unit may respectively be one of a red sub pixel unit, a green sub pixel unit and a blue sub pixel unit, and the first, second and third sub pixel unit are in different colors so that one of the pixel regions 210 includes tricolor sub pixel units that the red, green and blue sub pixel unit. Each of the sub pixel units may have a material of paint or dye.

In this embodiment, the fourth sub pixel unit 2141 may be a white sub pixel unit, a yellow sub pixel unit, a green sub pixel unit, etc. The fourth sub pixel unit may have a material of paint or dye.

In this embodiment, the first sub pixel region 211, second sub pixel region 212, third sub pixel region 213 and fourth sub pixel region 214 may be equal in area. Since the fourth sub pixel region 214 includes both the fourth sub pixel unit 2141 and second black matrix 2142, the fourth sub pixel unit 2141 may be smaller in area than the first sub pixel unit, second sub pixel unit and third sub pixel unit.

In some embodiment, the first sub pixel region 211, second sub pixel region 212, third sub pixel region 213 and fourth sub pixel region 214 may not be equal in area.

Referring to FIG. 3, along a row direction of the display panel, the second black matrix 2142 is between the fourth sub pixel unit 2141 and first black matrix 220. Along a column direction of the display panel, the first black matrix 220 surrounds the second black matrix 2142.

In this embodiment, the first black matrix 220 and the second black matrix 2142 may be manufactured employing a same material or different materials, and a specific material may include organic or inorganic such as inorganic black material containing chromium. Moreover, the first black matrix 220 and second black matrix 2142 may be manufactured using a same art or different arts, and a specific art may include dye method, paint dispersion method, printing method or electro-deposition method.

Referring to FIG. 4, multiple common electrodes 230 arranged in a matrix form are formed on the second substrate, and FIG. 4 illustrates two common electrodes 230 in a same row as representatives. A first interval region (not shown) is formed between two neighboring common electrodes 230 in a same row, and namely, the first interval region is disposed between two common electrodes 230 shown in FIG. 4.

Referring to FIG. 4, the first interval region may be set corresponding to both the first black matrix 220 and second black matrix 2142. As shown in FIG. 4, a dash-line frame 2142a represents a projection of the second black matrix 2142 on the first interval region.

Although a projection of the first black matrix 220 on the first interval region is not shown, the first interval region may be set corresponding to the first black matrix 220 except for a part of the first interval region surrounded by the dash-line frame 2142a.

In this embodiment, for the purpose that the first interval region may be set corresponding to both the first black matrix 220 and second black matrix 2142, the first interval region may be set facing both the first black matrix 220 and second black matrix 2142.

Referring to FIG. 4, this embodiment further includes: forming data wires 260 and gate wires 270 on the second substrate, which may restrict pixel regions (not shown) on the second substrate, and forming pixel electrodes 250 and thin-film transistors (not shown) in each the pixel region, where a drain, a source and a gate of each thin-film transistor are electrically connected to one of the pixel electrodes 250, one of the data wires 260 and one of the gate wires 270 respectively. The signal wires 240 are formed between two layers formed by the common electrodes 230 and data wires 260 respectively.

Even through not shown in FIG. 4, the signal wires 240 may be electrically connected to the common electrodes 230, and the common electrodes 230 may achieve at least two functions via the signal wires 240: at a display stage, the common electrodes 230 and the pixel electrodes 250 may provide a corresponding driving electric field; at a touch-control stage, the common electrodes 230 may become self-capacitance touch-control electrodes to detect touch operations.

In this embodiment, structures on the second substrate formed employing the following steps:

step 1: forming the patterned gate wires 270 on the second substrate, and depositing a first insulative material above the gate wires 270 to form a first insulative layer (not shown);

step 2: depositing a semiconductor material on the first insulative layer, and patterning the semiconductor material to form an active layer (not shown) above the gate wires 270;

step 3: depositing a second metal layer above the active layer and first insulative layer, patterning the second metal layer to form first conductive electrodes (such as sources) and second conductive electrodes (such as drains) both electrically connected to the active layer, forming the thin-film transistors each with a source, drain and one of the gate wires 270, maintaining the remaining partial metal layer as the data wires 260, where the first conductive electrodes may be electrically connected to the data wires 260;

step 4: depositing a second insulative material above the active layer and first insulative layer to form a second insulative layer (not shown), where the second insulative layer may be used to protect a groove region in the active layer;

step 5: forming an organic insulative layer (not shown) covering whole structures stated hereinbefore, where on one aspect, the organic insulative layer may have relatively good surface flatness; on the other aspect, the organic insulative layer may achieve a larger distance between electrode structures formed later (such as the common electrodes 230, pixel electrodes, etc) and structures such as the thin-film transistors, etc so as to reduce parasitic capacitance;

step 6: forming the common electrodes 230 on the organic insulative layer, wherein etching electrode material of the common electrodes 230 is required, where a region with the electrode material removed may form the first interval region;

step 7: forming a third insulative layer (not shown) on the common electrodes 230;

step 8: etching the third insulative layer and structures below the third insulative layer to form first through holes (not shown), where the first through holes may expose the common electrodes 230 and be filled by metal material to form the signal wires 240, which are electrically connected to the common electrodes 230;

step 9: etching the third insulative layer and the structures below the third insulative layer to form second through holes (not shown), where the second through holes may expose the second conductive electrodes, and forming the pixel electrodes on the third insulative layer, where the pixel electrodes are electrically connected to the second conductive electrodes via the second through holes.

In some embodiments, the common electrodes 230 and the pixel electrodes may be made of transparent conductive metal oxide, such as indium tin alloy. The first, second and third insulative layer may be made of material including silicon oxide, silicon nitride or silicon oxynitride, etc. The first, second and third insulative layer may interchange in order.

In the method provided in this embodiment, the second black matrix 2142 may be added on the first substrate, and the second black matrix 2142 may be used to cover the structures on the second substrate, which prevent exposure of the structures on the second substrate and light leakage appeared on the display panel.

On the second substrate, the first interval region may be set corresponding to both the first black matrix 220 and the second black matrix 2142. Compared to the first interval region may only be set corresponding to the first black matrix 220, the first interval region may become wider and the extended width is equivalent to a width of the second black matrix 2142. Expansion of the first interval region may prevent situations such as etching and residue between two neighboring common electrodes 230 in a same row and problems such as short circuit between two neighboring common electrodes 230 in a same row, and further improve the display performance of the display panel.

Another embodiment of the present disclosure provides another display panel.

Figure 5:
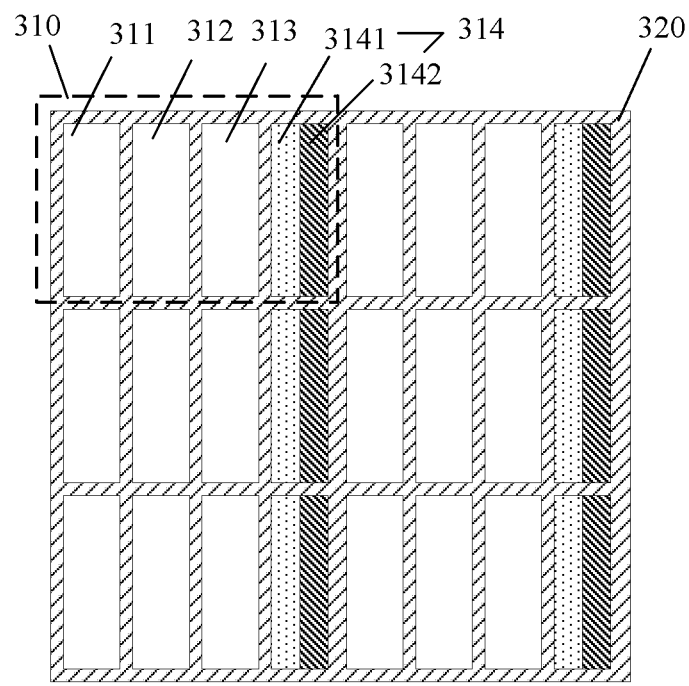
FIG. 5 schematically illustrates a diagram presenting a part of a first substrate in the display panel according to another embodiment of the present disclosure.
Figure 6:
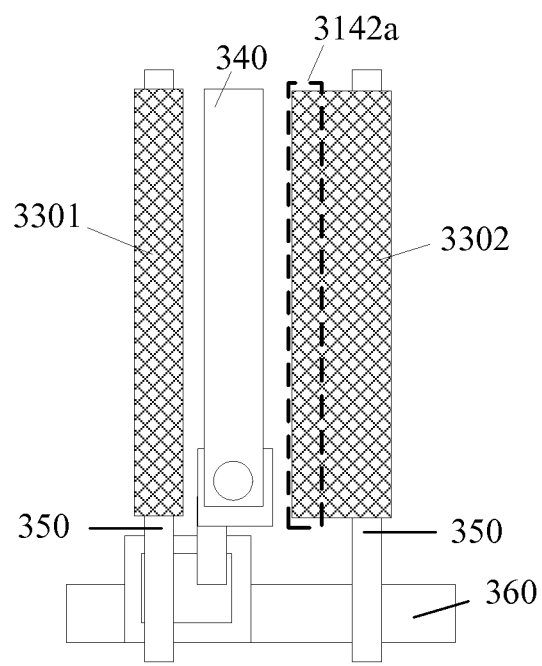
FIG. 6 schematically illustrates a diagram presenting a part of a second substrate in the display panel as shown in FIG. 5.

Referring to FIGS. 5 and 6, the present disclosure provides a display panel including a first substrate (not shown) and a second substrate (not shown), which may be set corresponding to each other. Wherein, partial structures of the first substrate are shown in FIG. 5, and partial structures of the second substrate are shown in FIG. 6. The first substrate may be a color-film substrate, and the second substrate may be an array substrate.

Referring to FIG. 5, the first substrate includes multiple pixel regions 310 arranged in a matrix form, one of the pixel regions 310 is surrounded by a dash-line frame as shown in FIG. 5. A first black matrix 320 is disposed in intervals between the pixel regions 310. Each of the pixel regions 310 includes a first sub pixel region 311, a second sub pixel region 312, a third sub pixel region 313 and a fourth sub pixel region 314. The first sub pixel region 311 may include a first sub pixel unit (not shown), the second sub pixel region 312 may include a second sub pixel unit (not shown), the third sub pixel region 313 may include a third sub pixel unit (not shown), and the fourth sub pixel region 314 includes a fourth sub pixel unit 3141 and a second black matrix 3142.

Specifically, the first black matrix 320 is disposed in intervals between the sub pixel regions.

In this embodiment, in each of the pixel regions 310, the first sub pixel region 311, second sub pixel region 312, third sub pixel region 313 and fourth sub pixel region 314 may be side-by-side arranged in order. In some embodiments, the fourth sub pixel region 314 may be arranged in front of the first sub pixel region 311, or four sub pixel regions may employ other permutations.

In this embodiment, the first sub pixel unit, the second sub pixel unit and the third sub pixel unit may respectively be one of a red sub pixel unit, a green sub pixel unit and a blue sub pixel unit, and the first, second and third sub pixel unit are in different colors so that one of the pixel regions 310 includes tricolor sub pixel units that the red, green and blue sub pixel unit.

In this embodiment, the fourth sub pixel unit 3141 may be a white sub pixel unit, a yellow sub pixel unit, a green sub pixel unit, etc.

In this embodiment, the first sub pixel region 311, the second sub pixel region 312, the third sub pixel region 313 and the fourth sub pixel region 314 may be equal in area. Since the fourth sub pixel region 314 includes both the fourth sub pixel unit 3141 and the second black matrix 3142, the fourth sub pixel unit 3141 may be smaller in area than the first sub pixel unit, the second sub pixel unit and the third sub pixel unit.

In some embodiment, the first sub pixel region 311, the second sub pixel region 312, the third sub pixel region 313 and the fourth sub pixel region 314 may not be equal in area.

Referring to FIG. 5, along a row direction of the display panel, the second black matrix 3142 is between the fourth sub pixel unit 3141 and first black matrix 320. Along a column direction of the display panel, the first black matrix 320 surrounds the second black matrix 3142.

Specifically, in this embodiment, the row direction is a horizontal direction as shown in FIG. 5, and the column direction is a vertical direction as shown in FIG. 5.

In this embodiment, the first black matrix 320 and the second black matrix 3142 may be manufactured employing a same material or different materials. Furthermore, the first black matrix 320 and the second black matrix 3142 may be manufactured simultaneously employing a same art or separately.

Referring to FIG. 6, multiple common electrodes (not shown) arranged in a matrix form are formed on the second substrate. Each of the common electrodes may be electrically connected to one of first signal wires, and FIG. 6 illustrates two of the first signal wires that a first signal wire 3301 and a first signal wire 3302 respectively.

In this embodiment, the first signal wire 3301 and 3302 may be disposed at two sides of one pixel region on the second substrate, where the two sides may be two sides corresponding to one pixel region along the row direction.

Although it is not shown in FIG. 6, the first black matrix 320 may be set corresponding to the first signal wire 3301, and namely, the first signal wire 3301 may completely overlap the first black matrix 320 along a direction perpendicular to a plane shown in FIG. 6.

Referring to FIG. 6, the first signal wire 3302 may be set corresponding to both the first black matrix 320 and the second black matrix 3142, and namely, the first signal wire 3302 may completely overlap both the first black matrix 320 and the second black matrix 3142 along the direction perpendicular to a plane shown in FIG. 6. As shown in FIG. 6, a dash-line frame 3142a represents a projection of the second black matrix 3142 on the first signal wire 3302.

Although a projection of the first black matrix 320 on the first signal wire 3302 is not shown, the first signal wire 3302 may be set corresponding to the first black matrix 320 except for a part of the first signal wire 3302 surrounded by the dash-line frame 3142a.

In this embodiment, at least one of the first signal wires may be set corresponding to both the first black matrix and the second black matrix. Specifically, in some embodiments, all of the first signal wires may be set corresponding to the first black matrix only. Even though the second black matrix added on the first substrate may not directly be set corresponding to the first signal wires, existence of the second black matrix may still lower a risk of exposing the first signal wires because the first signal wires may generally be manufactured using metal material, and when a deviation happens to correspondence of the first signal wires, the first signal wires may be covered by adding the second black matrix, and metal reflection due to the deviation of correspondence may not easily happen to the first signal wire so as to lower a risk of light leakage.

In this embodiment, for the purpose that the first signal wire 3302 may be set corresponding to both the first black matrix 320 and second black matrix 3142, the first signal wire 3302 may be set facing both the first black matrix 320 and second black matrix 3142.

In some embodiments, a first interval region (not shown) is disposed between two neighboring common electrodes in a same row. Except for the first signal wire 3302 may be set corresponding to both the first black matrix 320 and the second black matrix 3142, the first interval region may also set corresponding to both the first black matrix 320 and second black matrix 3142, and namely, the embodiment stated hereinbefore and this embodiment may be implemented collaboratively. Different embodiments in the present disclosure may be combined correspondingly.

Referring to FIG. 6, the second substrate has pixel electrodes 340, data wires 350 and gate wires 360. Each of the pixel electrodes 340, the data wires 350 and the gate wires 360 may be electrically connected to a drain, a source and a gate of a thin-film transistor (not labeled in FIG. 6) respectively.

Even through not shown in FIG. 6, each of the first signal wires may be electrically connected to one of the common electrodes, and the common electrodes may achieve at least two functions via the first signal wires: at a display stage, the common electrodes and the pixel electrodes 340 may provide a corresponding driving electric field; at a touch-control stage, the common electrodes may become self-capacitance touch-control electrodes to detect touch operations.

In the display panel provided in the present disclosure, the second black matrix 3142 may be added on the first substrate, and the second black matrix 3142 may cover structures on the second substrate to prevent exposure of the structures on the second substrate and light leakage appeared on the display panel so as to improve the display performance of the display panel.

On the second substrate, the first signal wire 3302 may be set corresponding to both the first black matrix 320 and the second black matrix 3142. Compared to the first signal wire 3302 may only be set corresponding to the first black matrix 320, the first signal wire 3302 may become wider and the extended width is equivalent to a width of the second black matrix 3142. Extension of the first signal wire 3302 width may reduce impedance of the first signal wire 3302 so as to reduce signal interference strength between the common electrodes at the touch-control stage, and further improve the touch-control performance of the display panel.

Specifically, in this embodiment, a width of the first signal wires is a size of the first signal wires along the row direction. A width of the second black matrix 3142 is a size of the second black matrix 3142 along the row direction.

The present disclosure also provides another method for forming a display panel, and the method may be used to form the display panel provided in the embodiment stated hereinbefore. Thus, the method may refer to corresponding content of the embodiment stated hereinbefore.

Referring to FIG. 5, a first substrate may be set including multiple pixel regions 310 arranged in a matrix form. A black matrix 320 may be formed in intervals between the pixel regions 310. A first sub pixel region 311, a second sub pixel region 312, a third sub pixel region 313 and a fourth sub pixel region 314 may be set in each of the pixel regions 310. A first sub pixel unit (not shown) may be formed in the first sub pixel region, a second sub pixel unit (not shown) may be formed in the second sub pixel region, a third sub pixel unit (not shown) may be formed in the third sub pixel region and a fourth sub pixel unit 3141 and a second black matrix 3142 may be formed in the fourth sub pixel region.

In this embodiment, in each of the pixel regions 310, the first sub pixel region 311, second sub pixel region 312, third sub pixel region 313 and fourth sub pixel region 314 may be side-by-side arranged in order. In some embodiments, the fourth sub pixel region 314 may be arranged in front of the first sub pixel region 311, or four sub pixel regions may employ other permutations.

In this embodiment, the first sub pixel unit, the second sub pixel unit and the third sub pixel unit may respectively be one of a red sub pixel unit, a green sub pixel unit and a blue sub pixel unit, and the first, second and third sub pixel unit are in different colors so that one of the pixel regions 310 includes tricolor sub pixel units that the red, green and blue sub pixel unit.

In this embodiment, the fourth sub pixel unit 3141 may be a white sub pixel unit, a yellow sub pixel unit, a green sub pixel unit, etc.

In this embodiment, the first sub pixel region 311, the second sub pixel region 312, the third sub pixel region 313 and the fourth sub pixel region 314 may be equal in area. Since the fourth sub pixel region 314 includes both the fourth sub pixel unit 3141 and second black matrix 3142, the fourth sub pixel unit 3141 may be smaller in area than the first sub pixel unit, second sub pixel unit and third sub pixel unit.

In some embodiment, the first sub pixel region 311, the second sub pixel region 312, the third sub pixel region 313 and the fourth sub pixel region 314 may not be equal in area.

Referring to FIG. 5, along a row direction of the display panel, the second black matrix 3142 is between the fourth sub pixel unit 3141 and first black matrix 320. Along a column direction of the display panel, the first black matrix 320 surrounds the second black matrix 3142.

Specifically, in this embodiment, the row direction is a horizontal direction as shown in FIG. 5, and the column direction is a vertical direction as shown in FIG. 5.

In this embodiment, the first black matrix 320 and the second black matrix 3142 may be manufactured employing a same material or different materials. Moreover, the first black matrix 320 and the second black matrix 3142 may be manufactured employing a same art or different arts.

Referring to FIG. 6, multiple common electrodes (not shown) arranged in a matrix form are formed on the second substrate, and each of the common electrodes may be set electrically connected to one of first signal wires. FIG. 6 illustrates two of the first signal wires that a first signal wire 3301 and a first signal wire 3302. The first signal wire 3301 may be set corresponding to the first black matrix 320.

Referring to FIG. 6, the first signal wire 3302 may be set corresponding to both the first black matrix 320 and second black matrix 3142. As shown in FIG. 6, a dash-line frame 3142*a* represents a projection of the second black matrix 3142 on the first signal wire 3302.

Although a projection of the first black matrix 320 on the first signal wire 3302 is not shown, the first signal wire 3302 may be set corresponding to the first black matrix 320 except for a part of the first signal wire 3302 surrounded by the dash-line frame 3142*a*.

In this embodiment, for the purpose that the first signal wire 3302 may be set corresponding to both the first black matrix 320 and the second black matrix 3142, the first signal wire 3302 may be set facing both the first black matrix 320 and second black matrix 3142.

In this embodiment, at least one of the first signal wires may be set corresponding to both the first black matrix and the second black matrix. Specifically, in some embodiments, all of the first signal wires may be set corresponding to the first black matrix only. Even though the second black matrix added on the first substrate may not directly be set corresponding to the first signal wires, existence of the second black matrix may still lower a risk of exposing the first signal wires.

Referring to FIG. 6, this embodiment further includes: forming data wires 350 and gate wires 360 on the second substrate, which may restrict pixel regions (not shown) on the second substrate, and forming pixel electrodes 340 and thin-film transistors in each of the pixel regions, where a drain, a source and a gate of each thin-film transistor are electrically connected to one of the pixel electrodes 340, one of the data wires 350 and one of the gate wires 360 respectively. The first signal wires may be formed between two layers formed by the common electrodes and data wires 350 respectively.

Even through not shown in FIG. 6, the first signal wires may be electrically connected to the common electrodes, and the common electrodes may achieve at least two functions via the first signal wires: at a display stage, the common electrodes and pixel electrodes 340 may provide a corresponding driving electric field; at a touch-control stage, the common electrodes may become self-capacitance touch-control electrodes to detect touch operations.

In the method provided in this embodiment, the second black matrix 3142 may be added on the first substrate, and the second black matrix 3142 may be used to cover the structures on the second substrate, which prevent exposure of the structures on the second substrate and light leakage appeared on the display panel so as to improve the display performance of the display panel.

On the second substrate, the first signal wire 3302 may be set corresponding to both the first black matrix 320 and second black matrix 3142. Compared to the first signal wire 3302 may only be set corresponding to the first black matrix 320, the first signal wire 3302 may become wider and the extended width is equivalent to a width of the second black matrix 3142. Extension of the first signal wire 3302 width may reduce impedance of the first signal wire 3302 so as to reduce signal interference strength between the common electrodes at the touch-control stage, and further improve the touch-control performance of the display panel.

Another embodiment of the present disclosure provides another display panel.

Figure 7:
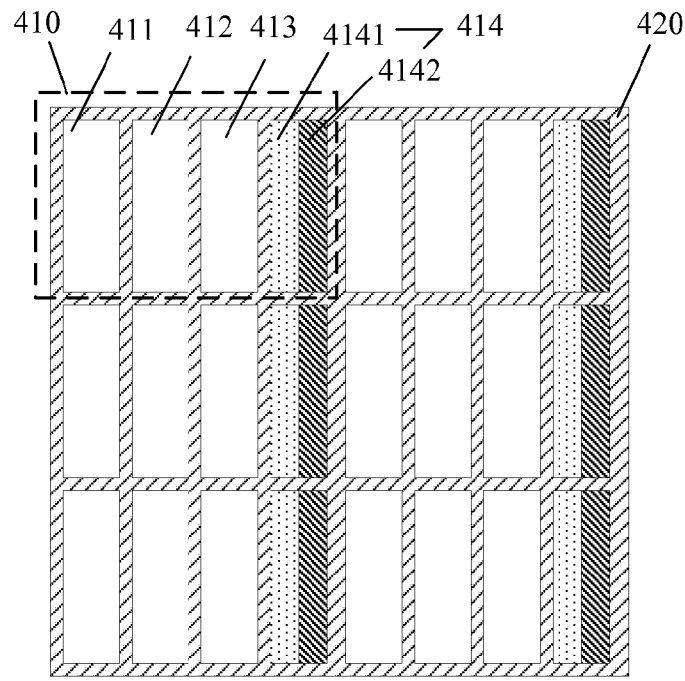
FIG. 7 schematically illustrates a diagram presenting a part of a first substrate in the display panel according to another embodiment of the present disclosure.
Figure 8:
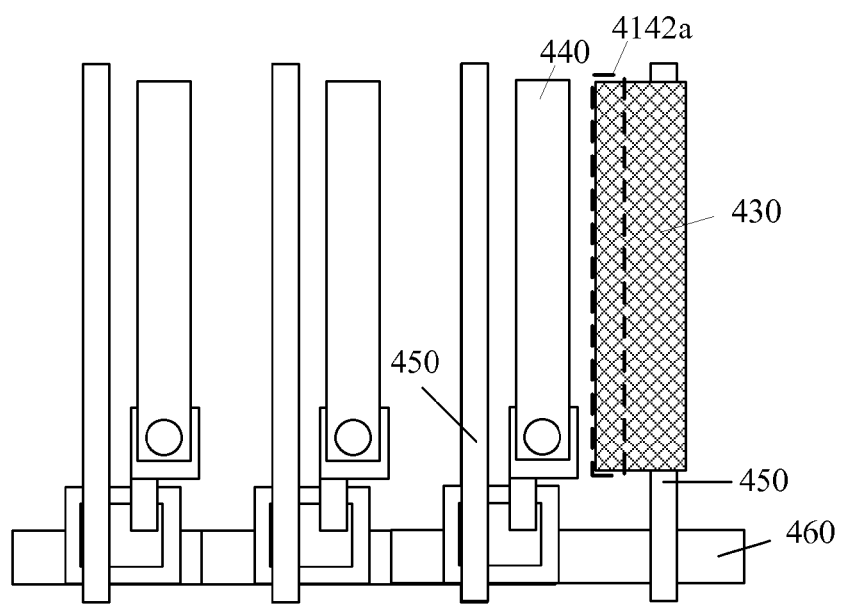
FIG. 8 schematically illustrates a diagram presenting a part of a second substrate in the display panel as shown in FIG. 7.

Referring to FIGS. 7 and 8, the present disclosure provides a display panel including a first substrate (not shown) and a second substrate (not shown), which may be set corresponding to each other. Wherein, partial structures of the first substrate are shown in FIG. 7, and partial structures of the second substrate are shown in FIG. 8. The first substrate may be a color-film substrate, and the second substrate may be an array substrate.

Referring to FIG. 7, the first substrate includes multiple pixel regions 410 arranged in a matrix form, one of the pixel regions 410 is surrounded by a dash-line frame as shown in FIG. 7. A first black matrix 420 is disposed in intervals between the pixel regions 410. Each of the pixel regions 410 includes a first sub pixel region 411, a second sub pixel region 412, a third sub pixel region 413 and a fourth sub pixel region 414. The first sub pixel region 411 may include a first sub pixel unit (not shown), the second sub pixel region 412 may include a second sub pixel unit (not shown), the third sub pixel region 413 may include a third sub pixel unit (not shown), and the fourth sub pixel region 414 includes a fourth sub pixel unit 4141 and a second black matrix 4142.

Specifically, the first black matrix 420 is disposed in intervals between the sub pixel regions.

In this embodiment, in each of the pixel regions 410, the first sub pixel region 411, the second sub pixel region 412, the third sub pixel region 413 and the fourth sub pixel region 414 may be side-by-side arranged in order. In some embodiments, the fourth sub pixel region 414 may be arranged in front of the first sub pixel region 411, or four sub pixel regions may employ other permutations.

In this embodiment, the first sub pixel unit, the second sub pixel unit and the third sub pixel unit may respectively be one of a red sub pixel unit, a green sub pixel unit and a blue sub pixel unit, and the first, second and third sub pixel unit are in different colors so that one of the pixel regions 410 includes tricolor sub pixel units that the red sub pixel unit, the green sub pixel unit and the blue sub pixel unit.

In this embodiment, the fourth sub pixel unit 4141 may be a white sub pixel unit, a yellow sub pixel unit, a green sub pixel unit, etc.

In this embodiment, the first sub pixel region 411, the second sub pixel region 412, the third sub pixel region 413 and the fourth sub pixel region 414 may be equal in area. Since the fourth sub pixel region 414 includes both the fourth sub pixel unit 4141 and the second black matrix 4142, the fourth sub pixel unit 4141 may be smaller in area than the first sub pixel unit, the second sub pixel unit and the third sub pixel unit.

In some embodiment, the first sub pixel region 411, the second sub pixel region 412, the third sub pixel region 413 and the fourth sub pixel region 414 may not be equal in area.

Referring to FIG. 7, along a row direction of the display panel, the second black matrix 4142 is between the fourth sub pixel unit 4141 and first black matrix 420. Along a column direction of the display panel, the first black matrix 420 surrounds the second black matrix 4142.

Specifically, in this embodiment, the row direction is a horizontal direction as shown in FIG. 7, and the column direction is a vertical direction as shown in FIG. 7.

In this embodiment, the first black matrix 420 and second black matrix 4142 may be manufactured employing a same material or different materials. Furthermore, the first black matrix 420 and second black matrix 4142 may be manufactured simultaneously employing a same art or separately.

Referring to FIG. 8, multiple common electrodes (not shown) arranged in a matrix form are formed on the second substrate. Each of the common electrodes may be electrically connected to one of first signal wires, and FIG. 8 illustrates a first signal wire 430.

Referring to FIG. 8, the first signal wire 430 may be set corresponding to both the first black matrix 420 and the second black matrix 4142, and namely, the first signal wire 430 may completely overlap both the first black matrix 420 and the second black matrix 4142 along a direction perpendicular to a plane shown in FIG. 8. As shown in FIG. 8, a dash-line frame 4142a represents a projection of the second black matrix 4142 on the first signal wire 430.

Although a projection of the first black matrix 420 on the first signal wire 430 is not shown, the first signal wire 430 may be set corresponding to the first black matrix 420 except for a part of the first signal wire 430 surrounded by the dash-line frame 4142a.

In this embodiment, each of the first signal wires may be set corresponding to both the first black matrix and second black matrix. Specifically, in some embodiments, some of the first signal wires may be set corresponding to the first black matrix only. Even though the second black matrix added on the first substrate may not directly be set corresponding to the first signal wires, existence of the second black matrix may still lower a risk of exposing the first signal wires.

In this embodiment, for the purpose that the first signal wire 430 may be set corresponding to both the first black matrix 420 and the second black matrix 4142, the first signal wire 430 may be set facing both the first black matrix 420 and the second black matrix 4142.

Referring to FIG. 8, the second substrate has pixel electrodes 440, data wires 450 and gate wires 460. Each of the pixel electrodes 440, the data wires 450 and the gate wires 460 may be electrically connected to a drain, a source and a gate of a thin-film transistor (not labeled in FIG. 8) respectively.

Even through not shown in FIG. 8, each of the first signal wires may be electrically connected to the common electrodes, and the common electrodes may achieve at least two functions via the first signal wire 430: at a display stage, the common electrodes and pixel electrodes 440 may provide corresponding a driving electric field; at a touch-control stage, the common electrodes may become self-capacitance touch-control electrodes to detect touch operations.

In the display panel provided in the present disclosure, the second black matrix 4142 may be added on the first substrate, and the second black matrix 4142 may cover the structures on the second substrate to prevent exposure of structures on the second substrate and light leakage appeared on the display panel so as to improve the display performance of the display panel.

On the second substrate, the first signal wire 430 may be set corresponding to both the first black matrix 420 and the second black matrix 4142. Compared to the first signal wire 430 may only be set corresponding to the first black matrix 420, the first signal wire 430 may become wider and the extended width is equivalent to a width of the second black matrix 4142. Extension of the first signal wire 430 width may reduce signal impedance of the first signal wire 430 so as to reduce signal interference strength between the common electrodes at the touch-control stage, and further improve the touch-control performance of the display panel.

Because the first signal wires only set corresponding to the first black matrix 420 may not exist, quantity of the first signal wires may reduce (FIG. 8 illustrate four data wires 450, only one of data wires 450 has a first signal wire 430 above), and structures of the display panel may be simplified.

Specifically, in this embodiment, a width of the first signal wire 430 is a size of the first signal wire 430 along the row direction. A width of the second black matrix 4142 is a size of the second black matrix 4142 along the row direction.

The present disclosure also provides another method for forming a display panel, and the method may be used to form the display panel provided in the embodiment stated hereinbefore. Thus, the method may refer to corresponding content of the embodiment stated hereinbefore.

Referring to FIG. 7, a first substrate may be set including multiple pixel regions 410 arranged in a matrix form. A black matrix 420 may be formed in intervals between the pixel regions 410. A first sub pixel region 411, a second sub pixel region 412, a third sub pixel region 413 and a fourth sub pixel region 414 may be set in each of the pixel regions 410. A first sub pixel unit (not shown) may be formed in the first sub pixel region 411, a second sub pixel unit (not shown) may be formed in the second sub pixel region 412, a third sub pixel unit (not shown) may be formed in the third sub pixel region 413 and a fourth sub pixel unit 4141 and a second black matrix 4142 may be formed in the fourth sub pixel region 414.

In this embodiment, in each of the pixel regions 410, the first sub pixel region 411, the second sub pixel region 412, the third sub pixel region 413 and the fourth sub pixel region 414 may be side-by-side arranged in order. In some embodiments, the fourth sub pixel region 414 may be arranged in front of the first sub pixel region 411, or four sub pixel regions may employ other permutations.

In this embodiment, the first sub pixel unit, the second sub pixel unit and the third sub pixel unit may respectively be one of a red sub pixel unit, a green sub pixel unit and a blue sub pixel unit, and the first, second and third sub pixel unit are in different colors so that one of the pixel regions 410 includes tricolor sub pixel units that the red sub pixel unit, the green sub pixel unit and the blue sub pixel unit.

In this embodiment, the fourth sub pixel unit 4141 may be a white sub pixel unit, a yellow sub pixel unit, a green sub pixel unit, etc.

In this embodiment, the first sub pixel region 411, the second sub pixel region 412, the third sub pixel region 413 and the fourth sub pixel region 414 may be equal in area. Since the fourth sub pixel region 414 includes both the fourth sub pixel unit 4141 and the second black matrix 4142, the fourth sub pixel unit 4141 may be smaller in area than the first sub pixel unit, the second sub pixel unit and the third sub pixel unit.

In some embodiment, the first sub pixel region 411, the second sub pixel region 412, the third sub pixel region 413 and the fourth sub pixel region 414 may not be equal in area.

Referring to FIG. 7, along a row direction of the display panel, the second black matrix 4142 is between the fourth sub pixel unit 4141 and first black matrix 420. Along a column direction of the display panel, the first black matrix 420 surrounds the second black matrix 4142.

Specifically, in this embodiment, the row direction is a horizontal direction as shown in FIG. 7, and the column direction is a vertical direction as shown in FIG. 7.

In this embodiment, the first black matrix 420 and second black matrix 4142 may be manufactured using same material or different materials. Moreover, the first black matrix 420 and second black matrix 4142 may be manufactured employing a same art or different arts.

Referring to FIG. 8, multiple common electrodes (not shown) arranged in a matrix form are formed on the second substrate, and each of the common electrodes may be set electrically connected to one of first signal wires. FIG. 8 illustrates a first signal wire 430.

Referring to FIG. 8, the first signal wire 430 may be set corresponding to both the first black matrix 420 and the second black matrix 4142. As shown in FIG. 8, a dash-line frame 4142a represents a projection of the second black matrix 4142 on the first signal wire 430.

Although a projection of the first black matrix 420 on the first signal wire 430 is not shown, the first signal wire 430 may be set corresponding to the first black matrix 420 except for a part of the first signal wire 430 surrounded by the dash-line frame 4142a.

In this embodiment, for the purpose that the first signal wire 430 may be set corresponding to both the first black matrix 420 and second black matrix 4142, the first signal wire 430 may be set facing the first black matrix 420 and the second black matrix 4142.

In this embodiment, all of the first signal wires may be set corresponding to both the first black matrix and the second black matrix. Specifically, in some embodiments, all of the first signal wires may be set corresponding to the first black matrix only. Even though the second black matrix added on the first substrate may not directly be set corresponding to the first signal wires, existence of the second black matrix may still lower a risk of exposing the first signal wire.

Referring to FIG. 8, this embodiment further includes: forming data wires 450 and gate wires 460 on the second substrate, which may restrict pixel regions (not shown) on the second substrate, and forming pixel electrodes 440 and thin-film transistors in each of the pixel regions, where a drain, a source and a gate of each thin-film transistor are electrically connected to one of the pixel electrodes 440, one of the data wires 450 and one of the gate wires 460 respectively. The first signal wire 430 may be formed between two layers formed by the common electrodes and data wires 450 respectively.

Even through not shown in FIG. 8, the first signal wire 430 may be electrically connected to the common electrodes, and the common electrodes may achieve at least two functions via the first signal wire 430: at a display stage, the common electrodes and pixel electrodes 440 may provide a corresponding driving electric field; at a touch-control stage, the common electrodes may become self-capacitance touch-control electrodes to detect touch operations.

In the method provided in this embodiment, the second black matrix 4142 may be added on the first substrate, and the second black matrix 4142 may be used to cover the structures on the second substrate, which prevent exposure of the structures on the second substrate and light leakage appeared on the display panel so as to improve the display performance of the display panel.

On the second substrate, the first signal wire 430 may be set corresponding to the first black matrix 420 and the second black matrix 4142. Compared to the first signal wire 430 may only be set corresponding to the first black matrix 420, the first signal wire 430 may become wider and the extended width is equivalent to a width of the second black matrix 4142. Extension of the first signal wire 430 width may reduce impedance of the first signal wire 430 so as to reduce signal interference strength between the common electrodes at the touch-control stage, and further improve the touch-control performance of the display panel.

Because the first signal wires only set corresponding to the first black matrix 420 may not exist, quantity of the first signal wires may reduce, and structures of the display panel may be simplified.

Another embodiment of the present disclosure provides another display panel.

Figure 9:
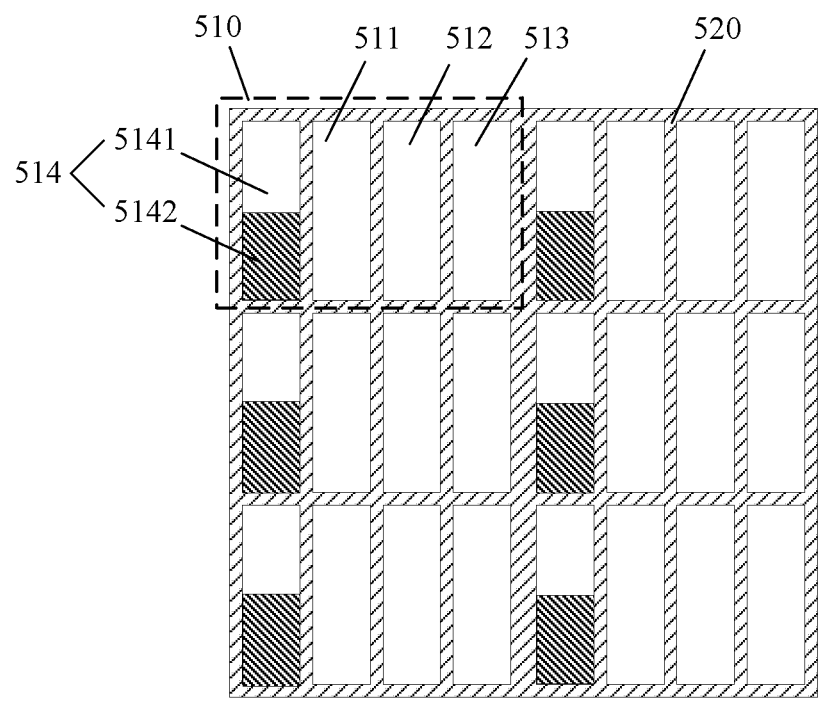
FIG. 9 schematically illustrates a diagram presenting a part of a first substrate in the display panel according to another embodiment of the present disclosure.
Figure 10:
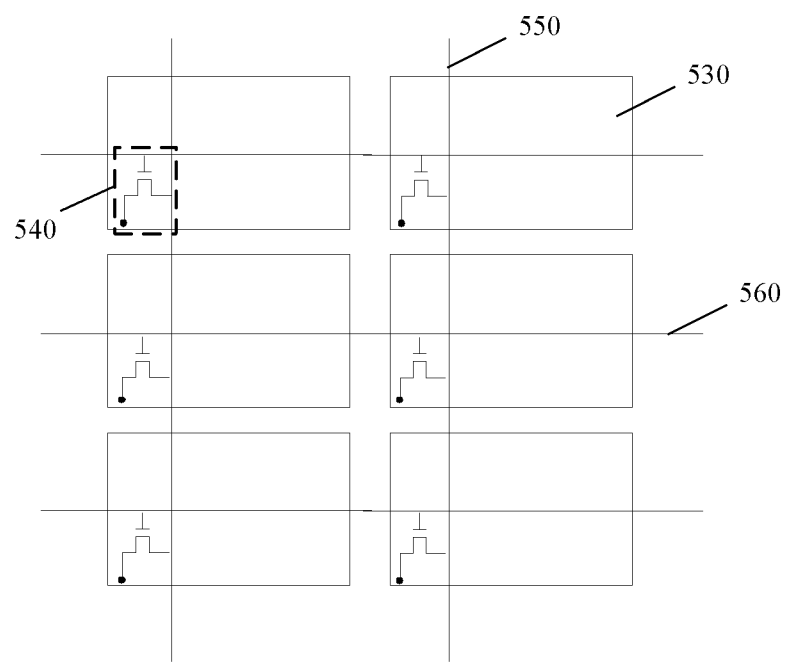
FIG. 10 schematically illustrates a diagram presenting a part of a second substrate in the display panel as shown in FIG. 9.

Referring to FIGS. 9 and 10, the present disclosure provides a display panel including a first substrate (not shown) and a second substrate (not shown), which may be set corresponding to each other. Wherein, partial structures of the first substrate are shown in FIG. 9, and partial structures of the second substrate are shown in FIG. 10. The first substrate may be a color-film substrate, and the second substrate may be an array substrate.

Referring to FIG. 9, the first substrate includes multiple pixel regions 510 arranged in a matrix form, one of the pixel regions 510 is surrounded by a dash-line frame as shown in FIG. 9. A first black matrix 520 is disposed in intervals between the pixel regions 510. Each of the pixel regions 510 includes a first sub pixel region 511, a second sub pixel region 512, a third sub pixel region 513 and a fourth sub pixel region 514. The first sub pixel region 511 may include a first sub pixel unit (not shown), the second sub pixel region 512 may include a second sub pixel unit (not shown), the third sub pixel region 513 may include a third sub pixel unit (not shown), and the fourth sub pixel region 514 includes a fourth sub pixel unit 5141 and a second black matrix 5142.

Specifically, the first black matrix 520 is disposed in intervals between the sub pixel regions.

In this embodiment, in each of the pixel regions 510, the fourth sub pixel region 514, the first sub pixel region 511, the second sub pixel region 512, the third sub pixel region 513 may be side-by-side arranged from left to right. In some embodiments, the fourth sub pixel region 514 may be arranged behind the third sub pixel region 513, or four sub pixel regions may employ other permutations.

In this embodiment, the first sub pixel unit, the second sub pixel unit and the third sub pixel unit may respectively be one of a red sub pixel unit, a green sub pixel unit and a blue sub pixel unit, and the first, second and third sub pixel unit are in different colors so that one of the pixel regions 510 includes tricolor sub pixel units that the red, green and blue sub pixel unit.

In this embodiment, the fourth sub pixel unit 5141 may be a white sub pixel unit, a yellow sub pixel unit, a green sub pixel unit, etc.

In this embodiment, the first sub pixel region 511, the second sub pixel region 512, the third sub pixel region 513 and the fourth sub pixel region 514 may be equal in area. Since the fourth sub pixel region 514 includes both the fourth sub pixel unit 5141 and the second black matrix 5142, the fourth sub pixel unit 5141 may be smaller in area than the first sub pixel unit, the second sub pixel unit and the third sub pixel unit.

In some embodiment, the first sub pixel region 511, the second sub pixel region 512, the third sub pixel region 513 and the fourth sub pixel region 514 may not be equal in area.

Referring to FIG. 9, along a row direction of the display panel, the second black matrix 5142 is between the fourth sub pixel unit 5141 and the first black matrix 520. Along a column direction of the display panel, the first black matrix 520 surrounds the second black matrix 5142.

Specifically, in this embodiment, the row direction is a horizontal direction as shown in FIG. 9, and the column direction is a vertical direction as shown in FIG. 9.

In this embodiment, the first black matrix 520 and second black matrix 5142 may be manufactured employing a same material or different materials. Furthermore, the first black matrix 520 and second black matrix 5142 may be manufactured simultaneously employing a same art or separately.

Referring to FIG. 10, multiple common electrodes 530 and multiple first thin-film transistors 514, which are arranged in a matrix form each, are formed on the second substrate. As shown in FIG. 10, a dash-line frame surrounds one of the first thin-film transistors 540. Each of the thin-film transistors 540 has a gate (not shown), a source (not shown) and a drain (not shown). The second substrate also has control signal wires 550 and touch-control display signal wires 560. Each of the common electrodes 530 may be electrically connected to the drain of one of the first thin-film transistors 540. Gates of the first thin-film transistors 540 in a same row are electrically connected to one of the control signal wires 550. Sources of the first thin-film transistors 540 in a same column are electrically connected to one of the touch-control display signal wires 560. The control signal wires 550 and the touch-control display signal wires 560 may be set corresponding to the first black matrix 520, which means the control signal wires 550 and the touch-control display signal wires 560 may completely overlap the first black matrix 520 along a direction perpendicular to a plane shown in FIG. 10, and the first thin-film transistors 540 may be set corresponding to the second black matrix 5142, which means the first thin-film transistors 540 may completely overlap the second black matrix 5142 along a direction perpendicular to a plane shown in FIG. 10.

In this embodiment, the control signal wires 550 may control on-off of the first thin-film transistors 540. Sources and drains of the first thin-film transistors 540 may be electrically connected to the touch-control display signal wires 560 and the common electrodes 530 respectively.

Since setting the first thin-film transistors 540, the control signal wires 550 and the touch-control display signal wires 560, when the display panel is operating, the control signal wires 550 may be adapted to switch on the first thin-film transistors 540, and the touch-control display signal wires 560 may be adapted to input a common voltage to the common electrodes 530 so as to realize normal display; when the display panel detects touch-control operations, the control signal wires 550 may be adapted to row-by-row switch on the first thin-film transistors 540, namely only switch on one row of the first thin-film transistors 540 at a same time, and a row of the common electrodes 530 corresponding to the switched-on first thin-film transistors 540 may achieve touch-control drive and induction via the touch-control display signal wires 560 to realize a normal touch-control function, and after driving and detecting the row is done, touch-control detection for next row of the common electrodes 530 may proceed. Namely, at a touch-control stage, each row of the common electrodes may be adapted to detect touch-control operations via row-by-row switching on the first thin-film transistors 540.

When employing structures integrating the first thin-film transistors 540, the control signal wires 550 and the touch-control display signal wires 560, each column of the common electrodes 530 may share one of the touch-control display signal wire 560 so as to reduce quantity of the touch-control display signal wires 560 and simplify the structures. For example, the common electrodes 530 arranged in a form of 28 rows by 16 columns, and each of the common electrodes 530 is 5 inches. If each of the common electrodes 530 is electrically connected to one of the touch-control display signal wires 560, 448 touch-control display signal wires 560 are required. However, employing this embodiment integrating the first thin-film transistors 540 and control signal wires 550, only 16 touch-control display signal wires 560 and 28 control signal wires 550 are required, and in total 44 signal wires are required which is only around one-tenth of 448. Accordingly, this embodiment may reduce quantity of the signal wires greatly, and for large and middle size display panels, quantity of corresponding signal wires may reduce more obviously.

In this embodiment, the second substrate may further include second thin-film transistors used to control the pixel electrodes (not shown). The pixel electrodes may set corresponding to the sub pixel regions on the first substrate. Furthermore, each of the pixel electrodes may be electrically connected to a drain of one of the second thin-film transistors.

In this embodiment, the first thin-film transistors 540 and second thin-film transistors may be made of a same material and manufactured using a same art, and layers of the first thin-film transistors 540 structures and layers of the second thin-film transistors structures may respectively be on a same layer.

In this embodiment, the first thin-film transistors 540 and the second thin-film transistors may be manufactured simultaneously.

In the display panel provided in the present disclosure, the second black matrix 5142 may be added on the first substrate. On the second substrate, there may have the first thin-film transistors 540 used to control each row of the common electrodes 530. Since the second black matrix 5142 may set corresponding to the first thin-film transistors 540, exposure of the first thin-film transistors 540 may be prevented, and light leakage appeared on the display panel may also be prevented, so as to improve the display performance of the display panel.

In addition, by integrating the first thin-film transistors 540, the control signal wires 550 and the touch-control display signal wires 560, quantity of the signal wires may greatly reduce and the structures of the display panel may be simplified.

The present disclosure also provides another method for forming a display panel, and the method may be used to form the display panel provided in the embodiment stated hereinbefore. Thus, the method may refer to corresponding content of the embodiment stated hereinbefore.

Referring to FIG. 9, a first substrate may be set including multiple pixel regions 510 arranged in a matrix form. A black matrix 520 may be formed in intervals region between the pixel regions 510. A first sub pixel region 511, a second sub pixel region 512, a third sub pixel region 513 and a fourth sub pixel region 514 may be set in each of the pixel regions 510. A first sub pixel unit (not shown) may be formed in the first sub pixel region 511, a second sub pixel unit (not shown) may be formed in the second sub pixel region 512, a third sub pixel unit (not shown) may be formed in the third sub pixel region 513 and a fourth sub pixel unit 5141 and a second black matrix 5142 may be formed in the fourth sub pixel region 514.

In this embodiment, in each of the pixel regions 510, the first sub pixel region 511, the second sub pixel region 512, the third sub pixel region 513 and the fourth sub pixel region 514 may be side-by-side arranged in order. In some embodiments, the fourth sub pixel region 514 may be arranged in front of the first sub pixel region 511, or four sub pixel regions may employ other permutations.

In this embodiment, the first sub pixel unit, the second sub pixel unit and the third sub pixel unit may respectively be one of a red sub pixel unit, a green sub pixel unit and a blue sub pixel unit, and the first, second and third sub pixel units are in different colors so that one of the pixel regions 510 includes tricolor sub pixel units that the red, green and blue sub pixel unit.

In this embodiment, the fourth sub pixel unit 5141 may be a white sub pixel unit, a yellow sub pixel unit, a green sub pixel unit, etc.

In this embodiment, the first sub pixel region 511, the second sub pixel region 512, the third sub pixel region 513 and the fourth sub pixel region 514 may be equal in area. Since the fourth sub pixel region 514 includes both the fourth sub pixel unit 5141 and the second black matrix 5142, the fourth sub pixel unit 5141 may be smaller in area than the first sub pixel unit, the second sub pixel unit and the third sub pixel unit.

In some embodiment, the first sub pixel region 511, the second sub pixel region 512, the third sub pixel region 513 and the fourth sub pixel region 514 may not be equal in area.

Referring to FIG. 9, along a row direction of the display panel, the second black matrix 5142 is between the fourth sub pixel unit 5141 and first black matrix 520. Along a column direction of the display panel, the first black matrix 520 surrounds the second black matrix 5142.

Specifically, in this embodiment, the row direction is a horizontal direction as shown in FIG. 9, and the column direction is a vertical direction as shown in FIG. 9.

In this embodiment, the first black matrix 520 and second black matrix 5142 may be manufactured employing a same material or different materials. Moreover, the first black matrix 520 and second black matrix 5142 may be manufactured employing a same art or different arts.

Referring to FIG. 10, multiple common electrodes 530 and multiple first thin-film transistors 514, which are arranged in a matrix form each, are formed on the second substrate. As shown in FIG. 10, a dash-line frame surrounds one of the first thin-film transistors 540. The thin-film transistors 540 each has a gate, a source and a drain. Control signal wires 550 and touch-control display signal wires 560 are formed on the first thin-film transistors 540. Each of the common electrodes 530 is set electrically connected to the drain of one of the first thin-film transistors 540. Gates of the first thin-film transistors 540 in a same row are set electrically connected to one of the control signal wires 550. Sources of the first thin-film transistors 540 in a same column are set electrically connected to one of the touch-control display signal wires 560. The control signal wires 550 and the touch-control display signal wires 560 may be set corresponding to the first black matrix 520, and the first thin-film transistors 540 may be set corresponding to the second black matrix.

In this embodiment, the control signal wires 550 may control on-off of the first thin-film transistors 540. Sources and drains of the first thin-film transistors 540 may be electrically connected to the touch-control display signal wires 560 and common electrodes 530 respectively.

Since setting the first thin-film transistors 540, the control signal wires 550 and the touch-control display signal wires 560, when the display panel is operating, the control signal wires 550 may be adapted to switch on the first thin-film transistors 540, and the touch-control display signal wires 560 may be adapted to input a common voltage to the common electrodes 530 so as to realize normal display; when the display panel detects touch control operations, the control signal wires 550 may be adapted to row-by-row switch on the first thin-film transistors 540, namely only switch on one row of the first thin-film transistors 540 at a same time, and a row of the common electrodes 530 corresponding to the switched-on first thin-film transistors 540 may achieve touch-control drive and induction via the touch-control display signal wires 560 to realize a normal touch-control function, and after driving and detecting the row is done, touch-control detection of next row of the common electrodes 530 may proceed. Namely, at a touch-control stage, each row of the common electrodes 530 may be adapted to detect touch control operations via row-by-row switching on the first thin-film transistors 540.

When employing structures integrating the first thin-film transistors 540, the control signal wires 550 and the touch-control display signal wires 560, each column of the common electrodes 530 may share one of the touch-control display signal wires 560 so as to reduce quantity of the touch-control display signal wires 560 and simplify the structures. For example, the common electrodes 530 arranged in a form of 28 rows by 16 columns, and each of the common electrodes 530 are 5 inches. If each of the common electrodes 530 is electrically connected to one of the touch-control display signal wires 560, 448 touch-control display signal wires 560 are required. However, employing this embodiment integrating the first thin-film transistors 540 and the control signal wires 550, only 16 touch-control display signal wires 560 and 28 control signal wires 550 are required, and in total 44 signal wires are required which is only around one-tenth of 448. Accordingly, this embodiment may reduce quantity of the signal wires greatly, and for large and middle size display panels, quantity of corresponding signal wires may reduce more obviously.

In this embodiment, the method may further include forming the pixel electrodes and second thin-film transistors on the second substrate. The pixel electrodes may set corresponding to the sub pixel regions on the first substrate. Furthermore, each of the pixel electrodes may be electrically connected to a drain of one of the second thin-film transistors.

In this embodiment, the first thin-film transistors 540 and second thin-film transistors may be made of a same material and manufactured using a same art, and layers of the first thin-film transistors 540 structures and layers of the second thin-film transistors structures may respectively be on a same layer.

In this embodiment, the first thin-film transistors 540 and the second thin-film transistors may be manufactured simultaneously.

In this embodiment, structures of the second substrate formed employing the following steps:

step 1: forming patterned base gate wires on the second substrate, and depositing a first insulative material above the base gate wires to form a first insulative layer (not shown);

step 2: depositing a semiconductor material on the first insulative layer, and patterning the semiconductor material to form an active layer (not shown) above the base gate wires;

step 3: depositing a second metal layer above the active layer and first insulative layer, patterning the second metal layer to form first conductive electrodes (such as sources) and second conductive electrodes (such as drains), forming the second thin-film transistors with the sources, drains and base gate wires, maintaining the remaining partial metal layer as the data wires, where the first conductive electrodes may be electrically connected to the data wires; specifically, when forming the second thin-film transistors, forming the first thin-film transistors 540 simultaneously through step 1 to 3 stated hereinbefore in this embodiment, where the first thin-film transistors may use the control signal wires 550 as the gate wires, and the control signal wires 550 and the base gate wires may be manufactured simultaneously in step 1;

step 4: depositing a second insulative material above the active layer and first insulative layer to form a second insulative layer (not shown), where the second insulative layer may be used to protect a groove region in the active layer;

step 5: forming an organic insulative layer (not shown) covering the whole structures stated hereinbefore, where on one aspect, the organic insulative layer may have relatively good surface flatness; on the other aspect, the organic insulative layer may achieve a larger distance between electrode structures formed later (such as the common electrodes 530, pixel electrodes, etc) and structures such as the thin-film transistors, etc so as to reduce parasitic capacitance;

step 6: etching the organic insulative layer and structures below the organic insulative layer to form first through holes exposing the drains of the first thin-film transistors 540;

step 7: forming the pixel electrodes and the touch-control display signal wires 560 on the organic insulative layer, and the touch-control display signal wires 560 may be electrically connected to the drains of the first thin-film transistors 540 via the first through holes;

step 8: forming a third insulative layer (not shown) on a layer of the pixel electrodes and the touch-control display signal wires 560;

step 9: etching the third insulative layer and structures below the third insulative layer to form second through holes (not shown), where the second through holes may expose the touch-control display signal wires 560, and forming the common electrodes 530 on the third insulative layer, where the common electrodes 530 are electrically connected to the touch-control display signal wires 560.

In some embodiments, the common electrodes 530 and pixel electrodes may be made of transparent conductive metal oxide, such as indium tin alloy. The first, second and third insulative layer may be made of material including silicon oxide, silicon nitride, silicon oxynitride, etc. The first, second and third insulative layer may interchange in order.

In the method provided in this embodiment, the second black matrix 5142 may be added on the first substrate. On the second substrate, the first thin-film transistors 540 used to control each row of the common electrodes 530 may be formed. Since the second black matrix 5142 may set corresponding to the first thin-film transistors 540, exposure of the first thin-film transistors 540 may be prevented, and light leakage appeared on the display panel may also be prevented, so as to improve the display performance of the display panel.

By integrating the first thin-film transistors 540, the control signal wires 550 and the touch-control display signal wires 560, quantity of the signal wires may greatly reduce, the structures of the display panel may be simplified and manufacturing art of the display panel may have a lower difficulty.

The disclosure is disclosed as above, but not limited. Based on the disclosure of the disclosure, those skilled in the art can make any variation and modification without departing from the spirit of the disclosure. Therefore, an extent of patent protection of the present disclosure is accordance with the claims.

What is claimed is:

1. A display panel, comprising:
a first substrate and a second substrate facing each other;
wherein the first substrate comprises a plurality of pixel regions arranged in a matrix form, and wherein a first black matrix disposed in intervals between the plurality of pixel regions;
wherein the plurality of pixel regions each comprises a first sub pixel region, a second sub pixel region, a third sub pixel region and a fourth sub pixel region;
wherein the first sub pixel region comprises a first sub pixel unit, the second sub pixel region comprises a second sub pixel unit, the third sub pixel region comprises a third sub pixel unit;
wherein the fourth sub pixel region comprises a fourth sub pixel unit and a second black matrix;
wherein an area of the fourth sub pixel unit is smaller than an area of each of the first sub pixel unit, the second sub pixel unit and the third sub pixel unit;
wherein the second substrate comprises a plurality of common electrodes arranged in a matrix form, wherein a first interval region is disposed between two neighboring common electrodes in a same row, and wherein the first interval region overlaps the first black matrix and the second black matrix in a direction perpendicular to a plane where the second substrate is arranged; and
wherein each of the plurality of common electrodes is electrically connected to a first signal wire, and at least one of the first signal wires overlaps the first black matrix and the second black matrix in the direction perpendicular to the plane where the second substrate is arranged.

2. The display panel according to claim 1, wherein, along a row direction of the display panel, the second black matrix is disposed between the fourth sub pixel unit and the first black matrix in each of the plurality of pixel regions.

3. The display panel according to claim 1, wherein each of the first signal wires overlaps the first black matrix and the second black matrix in the direction perpendicular to the plane where the second substrate is arranged in.

4. A display panel, comprising:
a first substrate and a second substrate facing each other;
wherein the first substrate comprises a plurality of pixel regions arranged in a matrix form, and wherein a first black matrix disposed in intervals between the plurality of pixel regions;
wherein the plurality of pixel regions each comprises a first sub pixel region, a second sub pixel region, a third sub pixel region and a fourth sub pixel region;
wherein the first sub pixel region comprises a first sub pixel unit, the second sub pixel region comprises a second sub pixel unit, the third sub pixel region comprises a third sub pixel unit;
wherein the fourth sub pixel region comprises a fourth sub pixel unit and a second black matrix;
wherein an area of the fourth sub pixel unit is smaller than an area of each of the first sub pixel unit, the second sub pixel unit and the third sub pixel unit;
wherein the second substrate comprises a plurality of second thin-film transistors arranged in a matrix form, and wherein a plurality of gate lines each connected to a gate of one of the plurality of second thin-film transistors; and
wherein, along a column direction of the display panel, the second black matrix is disposed between the fourth sub pixel unit and the first black matrix in each of the plurality of pixel regions, and wherein the column direction is perpendicular to a direction in which the plurality of gate lines extend.

5. The display panel according to claim 4, wherein the second substrate comprises:
a plurality of common electrodes arranged in a matrix form;
a plurality of thin-film transistors arranged in a matrix form, where each of the thin-film transistors comprises a gate, a source and a drain;
control signal wires; and
touch-control display signal wires;
wherein each of the common electrodes is electrically connected to the drain of one of the thin-film transistors;
wherein the gates of the thin-film transistors in a row are electrically connected to the control signal wires in a same row;
wherein the sources of the thin-film transistors in a column are electrically connected to the touch-control display signal wires in a same column; and
wherein the control signal wires and the touch-control display signal wires overlap the first black matrix in a direction perpendicular to a plane of the second substrate, and wherein the thin-film transistors overlap the second black matrix in the direction perpendicular to the plane of the second substrate.

6. A method for forming the display panel according to claim 4, comprising:
forming the first substrate and the second substrate facing to each other;
arranging the plurality of pixel regions in matrix form on the first substrate;
forming the first black matrix in an interval between two of the pixel regions;
forming the first sub pixel unit in the first sub pixel region;
forming the second sub pixel unit in the second sub pixel region;
forming the third sub pixel unit in the third sub pixel region;
forming the fourth sub pixel unit and the second black matrix in the fourth sub pixel region;
forming a plurality of second thin-film transistors arranged in a matrix form on the second substrate, and
forming a plurality of gate lines each connected to a gate of one of the plurality of second thin-film transistors on the second substrate;
wherein the plurality of pixel regions each comprises the first sub pixel region, the second sub pixel region, the third sub pixel region and the fourth sub pixel region;
wherein, along a column direction of the display panel, the second black matrix is formed between the fourth sub pixel unit and the first black matrix in each of the plurality of pixel regions, and wherein the column direction is perpendicular to a direction of the plurality of gate lines.

7. The method according to claim 6, further comprising:
forming a plurality of common electrodes in a matrix form on the second substrate;
forming a plurality of thin-film transistors in a matrix form, wherein the plurality of thin-film transistors each comprises: a gate, a source and a drain; and
forming control signal wires and touch-control display signal wires on the thin-film transistors;
wherein each of the common electrodes is set electrically connected to the drain of one of the thin-film transistors;
wherein gates of the thin-film transistors in a row are set electrically connected to the control signal wires in a same row;
wherein sources of the thin-film transistors in a column are set electrically connected to the touch-control display signal wires in a same column; and
wherein the control signal wires and the touch-control display signal wires overlap the first black matrix in a direction perpendicular to a plane of the second substrate, and wherein the thin-film transistors overlap the second black matrix in the direction perpendicular to the plane of the second substrate.

8. A method for forming a display panel, comprising:
forming a first substrate and a second substrate facing each other;
forming a plurality of pixel regions in a form of matrix on the first substrate;
forming a first black matrix in at least one of intervals between the plurality of pixel regions;
wherein the plurality of pixel regions each comprises a first sub pixel region, a second sub pixel region, a third sub pixel region and a fourth sub pixel region;
forming a first sub pixel unit in the first sub pixel region, forming a second sub pixel unit in the second sub pixel region, and forming a third sub pixel unit in the third sub pixel region;
forming a fourth sub pixel unit and a second black matrix in the fourth sub pixel region;
forming a plurality of common electrodes arranged in a matrix form on the second substrate;
forming a first interval region between two neighboring common electrodes in a same row, wherein the first interval region overlaps the first black matrix and the second black matrix in a direction perpendicular to a plane of the second substrate;
connecting the plurality of common electrodes each to a first signal wire, wherein at least one of the first signal wires overlaps the first black matrix and the second black matrix in the direction perpendicular to the plane of the second substrate;
wherein an area of the fourth sub pixel unit is smaller than an area of each of the first sub pixel unit, the second sub pixel unit and the third sub pixel unit.

9. The method according to claim 8, wherein, along a row direction of the display panel, the second black matrix is formed between the fourth sub pixel unit and the first black matrix in each pixel region of the plurality of pixel regions.

10. The method according to claim 8, wherein each of the first signal wires overlaps the first black matrix and the second black matrix in the direction perpendicular to the plane of the second substrate.

* * * * *